(12) United States Patent
Shiga et al.

(10) Patent No.: US 6,470,280 B2
(45) Date of Patent: Oct. 22, 2002

(54) FUMIGATION DETERMINATION APPARATUS AND METHOD, AND STORAGE MEDIUM

(75) Inventors: Ichiyou Shiga; Osamu Nishimoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 40 days.

(21) Appl. No.: 09/767,679

(22) Filed: Jan. 24, 2001

(65) Prior Publication Data

US 2002/0007250 A1 Jan. 17, 2002

(30) Foreign Application Priority Data

Jul. 17, 2000 (JP) ........................................ 2000-216074

(51) Int. Cl.[7] .............................................. G06F 19/00

(52) U.S. Cl. .............................. 702/31; 702/22; 702/23; 702/30

(58) Field of Search ............................... 702/31, 30, 23, 702/22; 422/62, 1, 83, 292; 43/125

(56) References Cited

U.S. PATENT DOCUMENTS 4,543,734 A  * 10/1985  Smith .......................... 34/284
5,520,881 A  *  5/1996  Koestler et al. ............... 422/1

* cited by examiner

*Primary Examiner*—Bryan Bui
*Assistant Examiner*—Hien Vo
(74) *Attorney, Agent, or Firm*—Staas &Halsey

(57) ABSTRACT

There are provided a fumigation determination apparatus, a fumigation determination method, and a storage medium, which facilitates determination as to whether or fumigation of exhibits is permitted. Fumigation schedule table-producing produces a fumigation schedule table showing a schedule for fumigation. Fumigation suitability management information-producing produces fumigation suitability management information, by adding fumigation suitability information indicative of whether or not the fumigation is permitted to exhibit management information for managing exhibits. Fumigation suitability determination determines whether or not the fumigation is permitted, by using the above produced fumigation suitability management information and fumigation schedule table. Determination result output outputs results of determination made by the fumigation suitability determination.

15 Claims, 16 Drawing Sheets

FIG. 3(a)

| AREA TO BE FUMIGATED | FUMIGATION TYPE | FUMIGATION START DATE |
|---|---|---|
| DISPLAY CORNER 21a | FUMIGATION A | 2000/4/11 12:00 |

FIG. 3(b)

| DISPLAY CORNER | SHIELDED BLOCK | ADJACENT SHIELDED BLOCK |
|---|---|---|
| DISPLAY CORNER 21a | SHIELDED BLOCK 21 | SHIELDED BLOCK 22 |
| DISPLAY CORNER 21b | SHIELDED BLOCK 21 | SHIELDED BLOCK 22 |
| DISPLAY CORNER 22a | SHIELDED BLOCK 22 | SHIELDED BLOCK 21 |
| DISPLAY CORNER 23a | SHIELDED BLOCK 23 | SHIELDED BLOCK 22 |

FIG. 4(a)

| FUMIGATION TYPE | FUMIGATION TIME | STANDARD FUMIGANT GAS-EXPELLING VENTILATION TIME |
|---|---|---|
| FUMIGATION A | 48 HOURS | 24 HOURS |
| FUMIGATION B | 72 HOURS | 24 HOURS |
| FUMIGATION C | 24 HOURS | 24 HOURS |

13a  EXAMPLES OF FUMIGATION TYPE

| FUMIGATION TYPE | FUMIGANT GAS | USE |
|---|---|---|
| FUMIGATION A | METHYL BROMIDE | (E.G.) STUFFED ANIMAL, BOTANICAL SPECIMEN |
| FUMIGATION B | ALUMINIUM PHOSPHIDE | (E.G.) BOTANICAL SPECIMEN |
| FUMIGATION C | HYDROGEN PHOSPHIDE | (E.G.) STUFFED ANIMAL |

31 FUMIGATION SCHEDULE TABLE

| FUMIGATION AREA | FUMIGATION TYPE | FUMIGATION START DATE | FUMIGANT GAS-EXPELLING VENTILATION START DATE | FUMIGANT GAS-EXPELLING VENTILATION COMPLETION DATE |
|---|---|---|---|---|
| DISPLAY CORNER 21a | FUMIGATION A | 2000/4/11 12:00 | 2000/4/13 12:00 | 2000/4/14 12:00 |
| DISPLAY CORNER 21b | FUMIGATION A | 2000/4/11 12:00 | 2000/4/13 12:00 | 2000/4/14 12:00 |
| DISPLAY CORNER 22a | FUMIGATION A | 2000/4/11 12:00 | 2000/4/13 12:00 | 2000/4/14 0:00 |

FIG. 6(a)

| EXHIBIT ID | TITLE | FORM | STORAGE PLACE | DISPLAY LOCATION |
|---|---|---|---|---|
| A008005 | LION | STUFFED | SHIELDED BLOCK 21 | DISPLAY CORNER 21a |
| H000001 | TURTLE | LIVING | SHIELDED BLOCK 21 | DISPLAY CORNER 21b |
| G003210 | SEA HORSE | LIVING | SHIELDED BLOCK 22 | DISPLAY CORNER 22a |

| FUMIGATION SUITABILITY INFORMATION |
|---|
| FUMIGATION A, FUMIGATION C |
| INHIBITED |
| INHIBITED |

15

| EXHIBIT ID | TITLE | FORM | STORAGE PLACE | DISPLAY LOCATION | FUMIGATION SUITABILITY INFORMATION |
|---|---|---|---|---|---|
| A008005 | LION | STUFFED | SHIELDED BLOCK 21 | DISPLAY CORNER 21a | FUMIGATION A, FUMIGATION C |
| H000001 | TURTLE | LIVING | SHIELDED BLOCK 21 | DISPLAY CORNER 21b | INHIBITED |
| G003210 | SEA HORSE | LIVING | SHIELDED BLOCK 22 | DISPLAY CORNER 22a | INHIBITED |

32 FUMIGATION SUITABILITY MANAGEMENT INFORMATION

FIG. 7

FUMIGATION DETERMINATION APPARATUS AND METHOD, AND STORAGE MEDIUM

BACKGROUND OF THE INVENTION (1) Field of the Invention

This invention relates to a fumigation determination apparatus and method for determining whether or not fumigation is permitted, and a computer-readable storage medium storing a program for causing a computer to carry out functions of the apparatus, and more particularly to a fumigation determination apparatus and method for determining whether or not fumigation is permitted within a facility where fumigation work is carried out by using a fumigant gas, and a computer-readable storage medium storing a program for causing a computer to carry out functions of the apparatus.

(2) Description of the Related Art

In a facility, such as a museum, where various materials are exhibited, antisepsis operation by using a fumigant gas (hereinafter referred to as "fumigation") is regularly carried out to exterminate pests or bugs from the exhibited materials.

The materials stored in the museum include non-living things, such as antiques, ancient legacies, books, paintings, and stuffed animals, and living things, such as animals and plants, with diverse kinds and variations among them. Further, there are also many kinds of fumigant gases, whose effects and influences are diverse as well. Information of the kinds, names, and exhibition places of materials exhibited in a museum or the like is managed by a database or the like owned by the museum. Conventionally, a person in charge of the fumigation in such a museum or the like determines whether or not the fumigation is permitted by consulting the database or the like.

Conventionally, however, whether the fumigation is permitted or not has been determined based on a manual operation by the person in charge, and hence it is an inconvenient and very difficult operation to carry out the determination. This problem comes to be considered critical in recent museums in which the number of exhibits as well as the number of living things which cannot be subjected to fumigation are markedly increasing.

SUMMARY OF THE INVENTION

It is an object of the invention to provide a fumigation determination apparatus which facilitates determination of whether or not fumigation of exhibits is permitted.

Further, another object of the invention is to provide a fumigation determination method which facilitates determination of whether or not fumigation of exhibits is permitted.

Further, to attain the above object, the present invention provides a fumigation determination apparatus for determining whether or not fumigation is permitted. This fumigation determination apparatus comprises shielded block table input means for inputting a shielded block table defining shielded blocks which are shielded spaces, fumigation type table input means for inputting a fumigation type table defining fumigation types indicative of types of fumigant gases, fumigation condition information input means for inputting fumigation condition information indicative of conditions for the fumigation, fumigation schedule table-producing means for producing a fumigation schedule table showing a fumigation schedule, by using the shielded block table input by the shielded block table input means, the fumigation type table input by the fumigation type table input means, and the fumigation condition information input by the fumigation condition information input means, fumigation suitability management information-producing means for producing fumigation suitability management information by adding fumigation suitability information indicative of whether or not the fumigation is permitted to exhibit management information for managing exhibits, fumigation suitability determination means for determining whether or not the fumigation is permitted by using the fumigation schedule table and the fumigation suitability management information, and determination result output means for outputting results of the determination made by the fumigation suitability determination means.

Still further, to attain the other object described above, the present invention provides a fumigation determination method of determining fumigation suitability. This fumigation determination method comprises the steps of inputting a shielded block table defining shielded blocks which are shielded spaces, inputting a fumigation type table defining fumigation types indicative of types of fumigant gases, inputting fumigation condition information indicative of conditions for the fumigation, producing a fumigation schedule table showing a fumigation schedule, by using the shielded block table, the fumigation type table, and the fumigation condition information, producing fumigation suitability management information by adding fumigation suitability information indicative of whether or not the fumigation is permitted to exhibit management information for managing exhibits, determining whether not the fumigation is permitted, by using the fumigation schedule table and the fumigation suitability management information, and outputting results of the determination as to whether or not the fumigation is permitted.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3(a) is a diagram showing the arrangement of information of conditions for carrying out fumigation;

FIG. 3(b) is a diagram showing a shielded block table;

FIG. 4(a) is a diagram showing the arrangement of a fumigation type table;

FIG. 4(b) is a diagram showing a table of examples of fumigation types;

FIG. 6(a) is a diagram showing the arrangement of exhibit management information;

FIG. 6(b) is a diagram showing the arrangement of fumigation suitability information;

FIG. 7 is a diagram showing the arrangement of fumigation suitability management information;

DESCRIPTION OF THE PREFERRED EMBODIMENTS

Preferred embodiments of the present invention will be described below with reference to accompanying drawings.

Figure 1:
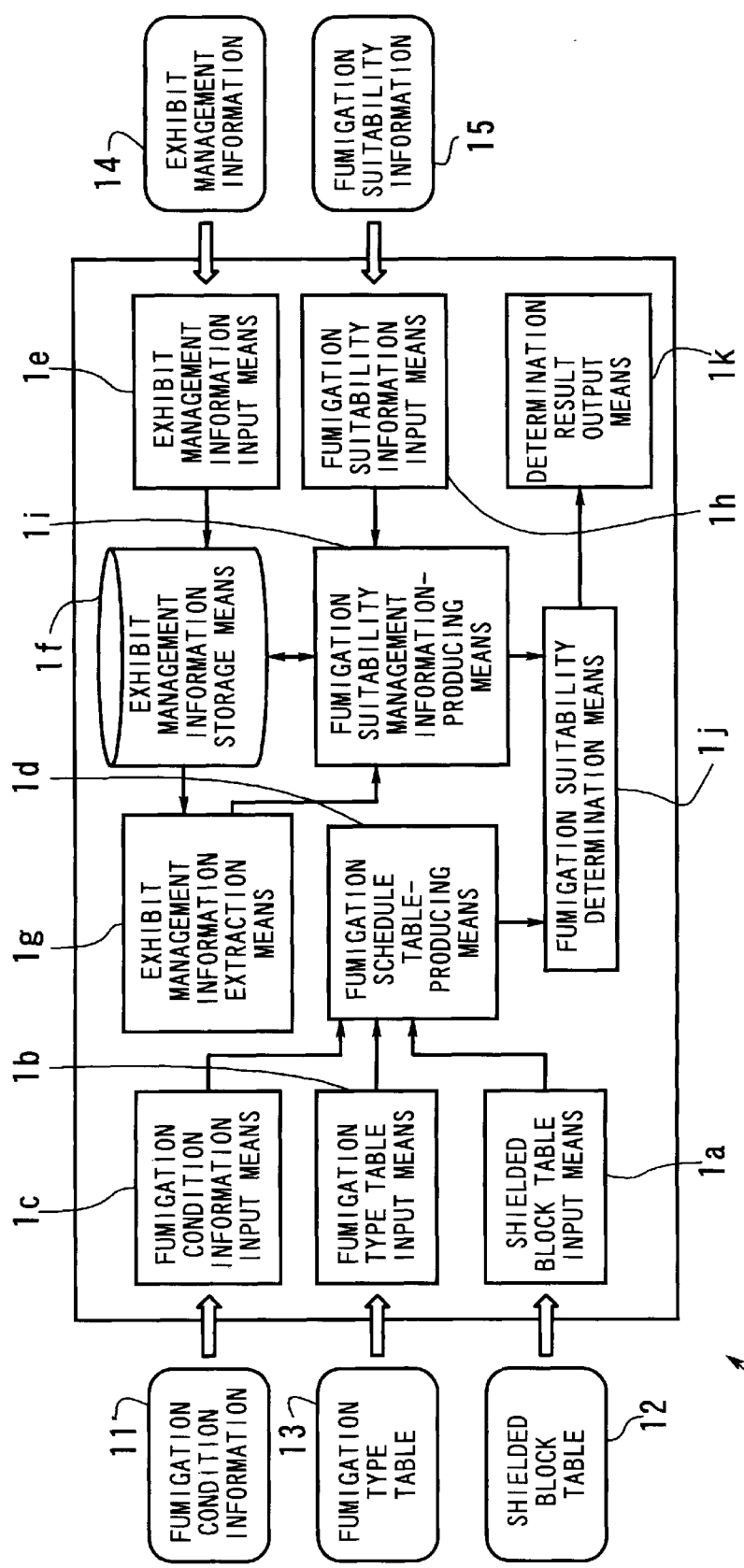
FIG. 1 is a diagram showing the arrangement of a fumigation determination apparatus.

FIG. 1 shows the arrangement of a fumigation determination apparatus according to the present embodiment.

The fumigation determination apparatus 1 is comprised of shielded block table input means 1a for inputting a shielded block table 12 that defines shielded blocks, i.e. shielded spaces, fumigation type table input means 1b for inputting a fumigation type table 13 that defines types of fumigation, i.e. types of fumigant gases, fumigation condition information input means 1c for inputting fumigation condition information 11 indicative of conditions for carrying out fumigation, fumigation schedule table-producing means 1d for producing a fumigation schedule table showing a fumigation schedule, by using the shielded block table 12 input by the shielded block table input means 1a, the fumigation type table 13 input by the fumigation type table input means 1b, and the fumigation condition information 11 input by the fumigation condition information input means 1c, exhibit management information storage means if for storing exhibit management information 14 for managing exhibits or materials to be exhibited, exhibit management information extraction means 1g for extracting the exhibit management information 14, fumigation suitability information input means 1h for inputting fumigation suitability information 15, fumigation suitability management information-producing means 1i for producing fumigation suitability management information by adding fumigation suitability information 15 indicative of fumigation suitability to the exhibit management information 14, fumigation suitability determination means 1j for determining fumigation suitability by using the fumigation schedule table and the fumigation suitability management information, and determination result output means 1k for outputting results of determination made by the fumigation suitability determination means 1j.

Here, the shielded block table input means 1a, the fumigation type table input means 1b, and the fumigation condition information input means 1c are implemented by a keyboard or the like for inputting various kinds of information items. The information items input via the above input means 1a, 1b, 1c are provided to the fumigation schedule table-producing means 1d. Further, similarly, exhibit management information input means 1e and the fumigation suitability information input means 1h are implemented by a keyboards or the like for inputting various kinds of information items. The information items input via the exhibit management information input means 1e and the fumigation suitability information input means 1h are provided to the exhibit management information storage means if and the fumigation suitability management information-producing means 1i, respectively. The exhibit management information storage means 1f is implemented by an information storage device, such as a hard disk or the like, for storing information items provided by the exhibit management information input means 1 e and the fumigation suitability management information-producing means 1i. The fumigation schedule table-producing means 1d, the exhibit management information extraction means 1g, the fumigation suitability management information-producing means 1i, and the fumigation suitability determination means 1j are implemented by a CPU (Central Processing Unit) or the like, and carry out operations according to a predetermined program. The determination result output means 1k is implemented by a display device, such as a display, for displaying results of determination of fumigation suitability etc. It should be noted that throughout the specification the term "exhibits" is used to mean not only non-living things, such as antiques, ancient legacies, books, paintings, and stuffed animals, but also living things, such as animals and plants.

Figure 2:
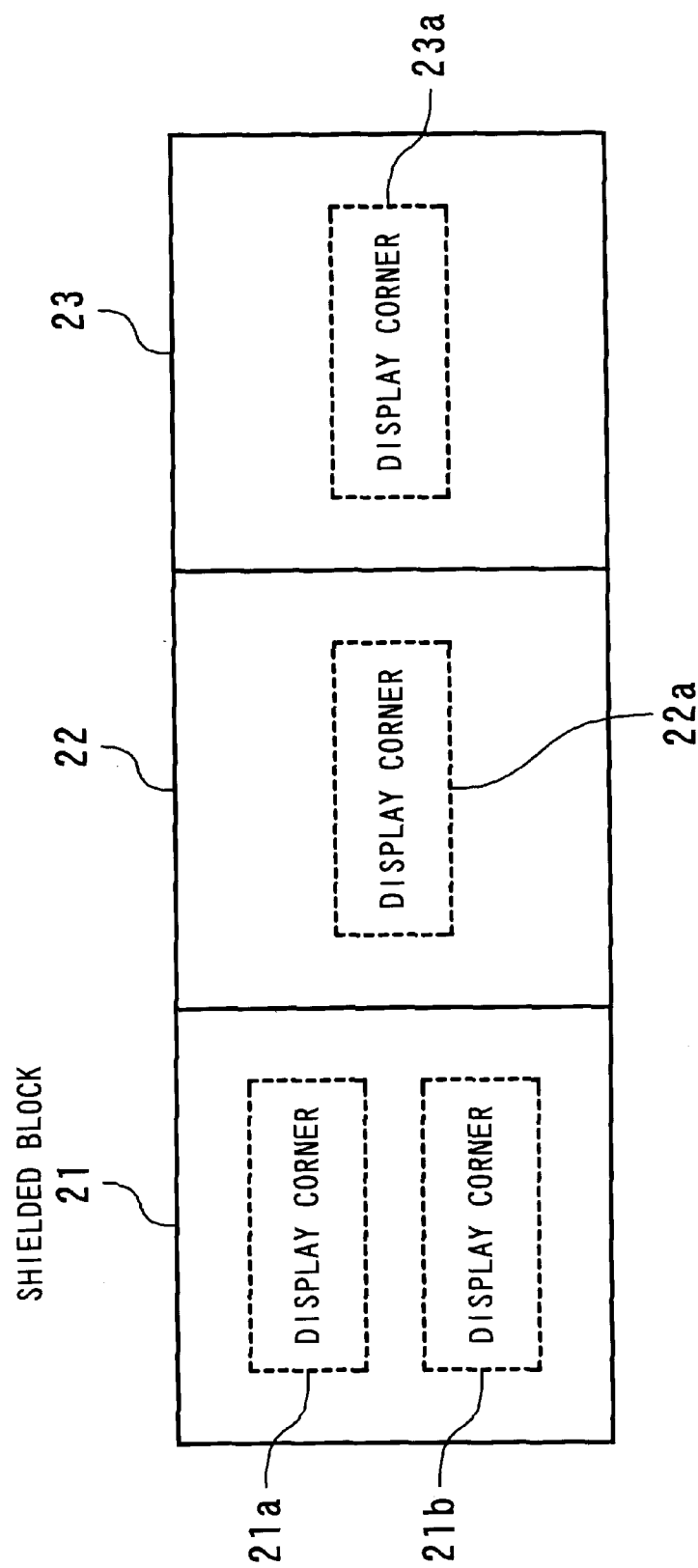
FIG. 2 is a diagram showing an example of the arrangement of a facility to be fumigated.

FIG. 2 shows an example of the arrangement of an exhibition facility for which fumigation is to be carried out. The illustrated facility is divided into three shielded blocks 21 to 23. The shielded block 21 has display corners 21a, 21b arranged therein, the shielded block 22 has an display corner 22a arranged therein, and the shielded block 23 has an display corner 23a arranged therein.

FIG. 3(a) shows the arrangement of the fumigation condition information 11.

The fumigation condition information 11 contains fumigation area information indicative of an area to be fumigated (fumigation area), fumigation type information indicative of a type of fumigant gas for fumigating the fumigation area, and fumigation start date information indicative of a date at which fumigation is to be started. In FIG. 3(a), "DISPLAY CORNDER 21a" corresponds to the fumigation area information, "FUMIGATION A" corresponds to the fumigation type information, and "2000/4/11 12:00" indicative of 12 o'clock, Apr. 11, 2000 corresponds to the fumigation start date information.

FIG. 3(b) shows the shielded block table 12.

The shielded block table 12 contains display corners for displaying exhibits, shielded blocks to which the display corners belong, and adjacent shielded blocks which are adjacent to the shielded blocks to which the display corners belong. In FIG. 3(b), "DISPLAY CORNER 21a", "DISPLAY CORNER 21b", "DISPLAY CORNER 22a", and "DISPLAY CORNER 23a" correspond to the display corners, "SHIELDED BLOCK 21", "SHIELDED BLOCK 22" and "SHIELDED BLOCK 23" to the shielded blocks, and "SHIELDED BLOCK 21" and "SHIELDED BLOCK 22" to the adjacent shielded blocks. Here, the display corners 21a, 21b belong to the shielded blocks 21, and an adjacent shielded block adjacent thereto is the shielded block 22. The display corner 22a belongs to the shielded block 22, and an adjacent shielded block adjacent thereto is the shielded block 21. The display corner 23a belongs to the shielded block 23, and an adjacent shielded block adjacent thereto is the shielded block 22.

FIG. 4(a) shows the arrangement of the fumigation type table 13.

The fumigation type table 13 contains fumigation types indicative of types of fumigant gases, fumigation time periods, and standard fumigant gas-expelling ventilation time periods. In FIG. 4(a), "FUMIGATION A", "FUMIGATION B", and "FUMIGATION C" correspond to the fumigation types, "48 HOURS", "72 HOURS," and "24 HOURS" correspond to the fumigation time periods, and "24 HOURS" corresponds to the standard fumigant gas-expelling ventilation time period. A fumigation time period over which the fumigation A is carried out is 48 hours, a fumigation time period over which the fumigation B is carried out is 72 hours, and a fumigation time period over which the fumigation C is carried out is 24 hours. Standard fumigant gas-expelling ventilation time periods of the fumigation A to the fumigation C are all 24 hours.

FIG. 4(b) shows a table 13a showing examples of fumigation types.

As shown in FIG. 4(b), methyl bromide suitable for fumigating stuffed animals and botanical specimens, aluminum phosphide suitable for fumigating botanical specimens, and hydrogen phosphide suitable for fumigating stuffed animals are entered as respective fumigation types of the fumigation A, the fumigation B, and the fumigation C, by way of example.

Figure 5:
FIG. 5 is a diagram showing the arrangement of a fumigation schedule table.

FIG. 5 shows the arrangement of the fumigation schedule table 31.

The fumigation schedule table 31 contains fumigation areas, fumigation types indicative of types of fumigant gases, fumigation start dates at which fumigation is to be started, fumigant gas-expelling ventilation start dates, and fumigant gas-expelling ventilation completion dates. In FIG. 5, "DISPLAY CORNER 21a", "DISPLAY CORNER 21b" and "DISPLAY CORNER 22a" correspond to the fumigation areas, "FUMIGATION A" corresponds to the fumigation type, "2000/4/11 12:00" corresponds to the fumigation start date, "2000/4/13 12:00" corresponds to the fumigant gas-expelling ventilation start date, and "2000/4/14 12:00" and 2000/4/14 0:00" correspond to the fumigant gas-expelling ventilation completion dates. This shows that the fumigation type for the display corners 21a, 21b, 22a is fumigation A, the fumigation start date is 12 o'clock, Apr. 11, 2000, the fumigant gas-expelling ventilation start date is 12 o'clock, Apr. 13, 2000, and that the fumigant gas-expelling ventilation completion date for the display corners 21a, 21b, is 12 o'clock, Apr. 14, 2000, while the fumigant gas-expelling ventilation completion date for the display corner 22a, is 0 o'clock, Apr. 14, 2000.

FIG. 6(a) shows the arrangement of the exhibit management information 14.

The exhibit management information 14 contains IDs, titles, and forms of exhibits, storage places for storing the exhibits, and display locations at which the exhibits are displayed. In FIG. 6(a), "A008005", "H000001" and "G0033210" correspond to the exhibit IDs, "LION", "TURTLE" and "SEA HORSE" correspond to the exhibit titles, "STUFFED" and "LIVING" corresponding to the exhibit forms, "SHIELDED BLOCK 21" and "SHIELDED BLOCK 22" corresponding to the storage places, and "DISPLAY CORNER 21a", "DISPLAY CORNER 21b" and "DISPLAY CORNER 22a" corresponding to the display locations. Further, in the illustrated example, the exhibit ID "A008005" corresponds to the exhibit title "lion", the exhibit form "stuffed", the storage place "shielded block 21", and the display location "display corner 21a", the exhibit ID "H000001" corresponds to the exhibit title "turtle", the exhibit form "living", the storage place "shielded block 21", and the display location "display corner 21b", and the exhibit ID "G003210" corresponds to the exhibit title "sea horse", the exhibit form "living", the storage place "shielded block 22", and the display location "display corner 22a".

FIG. 6(b) shows the arrangement of the fumigation suitability information 15.

In FIG. 6(b), "FUMIGATION A, FUMIGATION C" and "INHIBITED" correspond to the fumigation suitability information. In the illustrated example, "FUMIGATION A, FUMIGATION C" indicate that only the fumigation A and the fumigation C are permitted, and "INHIBITED" indicates that fumigation is not permitted.

FIG. 7 shows the arrangement of fumigation suitability management information 32.

The fumigation suitability management information 32 contains the exhibit IDs, the exhibit titles, the exhibit forms, the storage places, the display locations, and the fumigation suitability information. Here, the exhibit having the ID "A008005" and the title "lion" is permitted to be fumigated only by the fumigation A and the fumigation C, while neither of the exhibits having the IDs "H000001" and "G003210" and the titles "turtle" and "sea horse", respectively, are permitted to be fumigated.

Next, operations of the fumigation determination apparatus 1 will be described with reference to FIGS. 1 to 7.

First of all, a procedure of producing the fumigation schedule table 31 is described.

First, the user inputs the shielded block table 12, shown in FIG. 3(b), by using the shielded block table input means, the fumigation type table 13, shown in FIG. 4(a), by using the fumigation type table input means 1b, and the fumigation condition information 11, appearing in FIG. 3(a), by using the fumigation condition information input means 1c. The fumigation condition information 11, the shielded block table 12, and the fumigation type table 13, entered as above, are once stored in a memory, not shown, and then supplied to the fumigation schedule table-producing means 1d.

The fumigation schedule table-producing means 1d supplied with the fumigation condition information 11, the shielded block table 12, and the fumigation type table 13 forms the fumigation schedule table 31 according to the following procedure:

First, it is determined with reference to the fumigation condition information 11 and the shielded block table 12, whether or not a shielded block to which belongs a fumigation area shown in the fumigation area information in the fumigation condition information 11 includes another display corner. Basically, every fumigation area in the fumigation condition information 11 is set to a fumigation area in the fumigation schedule table 31. Now, when there exists another display corner included in the relevant shielded block as described above, it is added to an entry of the fumigation area of the fumigation schedule table 31. In the case of the fumigation condition information 11 shown in FIG. 3(a), the display corner 21a as a fumigation area belongs to the shielded block 21, as indicated in the shielded block table 12 shown in FIG. 3(b), and the shielded block 21 includes the display corner 21b which is a display corner other than the display corner 21a. Therefore, the display corner 21b is added to an entry of the fumigation area of the fumigation schedule table 31, whereby the display corner 21a in the fumigation condition information 11 and the display corner 21b are set to fumigation areas of the fumigation schedule table 31.

Next, a fumigation type and a fumigation start date in the fumigation condition information 11 are set to a fumigation type and a fumigation start date in the fumigation schedule table 31. Here, as for an additional display corner added as above, the fumigation type and fumigation start date of an original display corner for which fumigation is to be originally carried out, that is, a display corner belonging to the same shielded block are set to the fumigation type and fumigation start date of the additional display corner.

Next, a fumigant gas-expelling ventilation start date, and a fumigant gas-expelling ventilation completion date in the fumigation schedule table 31 are calculated with reference to the fumigation type table 13. More specifically, a fumigation time period and a standard fumigant gas-expelling ventilation time period corresponding to a fumigation type in the fumigation schedule table 31 are extracted from the fumigation type table 13, and the fumigation time period extracted is added to the fumigation start date to thereby calculate a fumigant gas-expelling ventilation start date. Further, the extracted standard fumigant gas-expelling ventilation time period is added to the fumigant gas-expelling ventilation start date calculated as above, whereby a fumigant gas-expelling ventilation completion date is calculated. In the case of FIG. 4(a) and FIG. 5, the fumigation types shown in the fumigation schedule table 31 are all "FUMIGATION A", and the fumigation time period and the standard fumigant gas-expelling ventilation time period corresponding to "FUMIGATION A", in the fumigation type table 13 are "48 HOURS" and "24 HOURS", respectively. Further, in the FIG. 5 fumigation schedule table 31, all the fumigation start dates are "2000/4/11 12:00", and hence by adding 48 hours to "2000/4/11 12:00", the resulting date "2000/4/13 12:00" is set to the fumigant gas-expelling ventilation start date. On the other hand, the fumigant gas-expelling ventilation completion date is set to "2000/4/14 12:00" which is a date obtained by adding 24 hours to the fumigant gas-expelling ventilation start date "2000/4/13 12:00".

Next, it is determined with reference to the shielded block table 12, whether or not there exists an adjacent shielded block adjacent to a shielded block including a fumigation area. The adjacent shielded block is a shielded block adjacent to a predetermined shielded block. The presence or absence of such an adjacent shielded block is determined here because it is required to take into account leakage of a fumigant gas from a shielded block having a fumigation area to an adjacent shielded block. More specifically, although each shielded block is shielded by shielding plates, doors, or the like, generally, these shielding means do not provide very high airtightness, so that a certain amount of fumigant gas leaks to a shielded block adjacent to the shielded block subjected to the fumigation. As a result, the adjacent shielded block is fumigated by the fumigant gas when this block is not to be fumigated. This fumigation of the adjacent shielded block can adversely affect exhibits displayed therein. In the present embodiment, in view of the above problem, every display corner included in an adjacent shielded block is added to the fumigation area to the fumigation schedule table 31. In the case of FIG. 3, a shielded block containing the display corner 21a as a fumigation area is the shielded block 21, and a shielded block adjacent to the shielded block 21 is the shielded block 22. Further, the shielded block 22 adjacent to the shielded block 21 has the display corner 22a arranged therein. Therefore, the display corner 22a is newly added to an entry of the fumigation area of the fumigation schedule table 31.

Next, the fumigation type and the fumigation start date in the fumigation condition information 11 are set to a fumigation type and a fumigation start date in the fumigation schedule table 31, corresponding to the fumigation area added as above. It should be noted that a fumigation type and a fumigation start date set here are a fumigation type and a fumigation start date in the fumigation condition information 11, which correspond to a fumigation area included in a shielded block causing fumigation of a fumigation area added as above, that is, a shielded block adjacent to an adjacent shielded block containing the added fumigation area. In the case of FIG. 3 and FIG. 5, a shielded block causing fumigation of the added fumigation area 22a is the shielded block 21, and a fumigation area included in the shielded block 21 is the display corner 21a. Further, in the fumigation condition information 11 shown in FIG. 3(a), a fumigation type and a fumigation start date corresponding to the display corner 21a are "FUMIGATION A" and "2000/4/11 12:00", respectively. Therefore, "FUMIGATION A" and "2000/4/11 12:00" are set to the fumigation type and the fumigation start date, respectively, of the fumigation area added as above in the fumigation schedule table 31.

Next, a fumigant gas-expelling ventilation start date, and a fumigant gas-expelling ventilation completion date corresponding to the added fumigation area are calculated with reference to the fumigation type table 13. Although this calculation is carried out in almost the same manner as carried out when the fumigant gas-expelling ventilation start date and the like corresponding to each fumigation area in the fumigation condition information 11 are calculated, the former calculation is distinguished from the latter only in that a standard fumigant gas-expelling ventilation time is multiplied by a predetermined coefficient when the fumigant gas-expelling ventilation completion date is calculated. The standard fumigant gas-expelling ventilation time is multiplied by the predetermined coefficient because in an adjacent shielded block, it takes a shorter time period to expel a fumigant gas since the concentration of a fumigant gas in the adjacent shielded block is lower than that of the fumigant gas in the shielded block actually or originally subjected to fumigation. In the FIG. 5 fumigation schedule table 31, the above coefficient is set to 0.5 for calculation. Accordingly, the standard fumigant gas-expelling ventilation time period "24 HOURS" required for the fumigation A shown in the fumigation type table 13 is multiplied by 0.5, and the resulting value "12 hours" is added to the fumigant gas-expelling ventilation start date "2000/4/13 12:00", whereby "2000/4/14 0:00" is obtained as a fumigant gas-expelling ventilation completion date for the display corner 22a.

Next, a procedure of producing the fumigation suitability management information 32 will be described.

Before producing the fumigation suitability management information 32, the user inputs the exhibit management information 14 for management of exhibits, by using the exhibit management information input means 1e. The exhibit management information 14 entered as above is stored in the exhibit management information storage means 1f for management of the exhibits.

When the fumigation suitability management information 32 is produced, first, the exhibit management information extraction means 1g extracts the exhibit management information 14 stored in the exhibit management information storage means 1f, and transmits the exhibit management information 14 to the fumigation suitability management information-producing means 1i.

After the exhibit management information 14 has been extracted, fumigation suitability information 15 to be added to the exhibit management information 14 is set. To set the fumigation suitability information 15, there are employed two setting methods: an automatic setting method in which fumigation suitability is automatically determined and set to the fumigation suitability information 15, and an input setting method in which fumigation suitability is determined and set to the fumigation suitability information 15 by the user. When the fumigation suitability information 15 is set by the automatic setting method, first, the fumigation suitability management information-producing means 1i determines whether or not an exhibit to be fumigated is a living thing, by referring to forms of exhibits shown in the exhibit management information 14. Here, if the exhibit is a living thing, the fumigation suitability information 15 corresponding to the exhibit is set to "inhibited", whereas if the exhibit is not a living thing, the fumigation suitability information 15 is set to "permitted". On the other hand, when the fumigation suitability information 15 is set by the input setting method, the user determines with reference to the extracted exhibit management information 14, whether or not each exhibit shown in the exhibit management information 14 is permitted to be fumigated, and inputs the fumigation suitability information 15 via the fumigation suitability information input means 1h. For the fumigation suitability information 15 input here, it is also possible to set not only information concerning whether the fumigation is permitted, but also conditions for fumigation, e.g. a condition that fumigation is permitted only by a specific fumigant gas. The fumigation suitability information 15 shown in FIG. 6(b) contain entries of "FUMIGATION A, FUMIGATION C" which mean that the exhibit is permitted to be fumigated only by the fumigation A and the fumigation C, and "INHIBITED" which indicate that the exhibit is not permitted to be fumigated. The fumigation suitability information 15 set as above is added to the exhibit management information 14 and the fumigation suitability management information 32 as shown in FIG. 7 is produced. The fumigation suitability management information 32 is stored in the exhibit management information storage means 1f, and used for determination of fumigation suitability.

Next, a fumigation suitability determination operation will be described which is carried out by the fumigation suitability determination means 1j by using the fumigation schedule table 31 created by the fumigation schedule table-producing means 1d, and the fumigation suitability management information 32 produced by the fumigation suitability management information-producing means 1i.

First, an exhibit on which the fumigation suitability determination operation is to be carried out is selected from the fumigation suitability management information 32, and a display location at which the selected exhibit is displayed is extracted. Next, it is determined whether or not the display location extracted as above is coincident with any one of the fumigation areas in the fumigation schedule table 31.

If the extracted display location is not coincident with any fumigation area, the display location is not a fumigation area, so that the fumigation suitability determination means 1j determines that there occurs no problem of fumigation as to the exhibit.

On the other hand, if the extracted display location is coincident with any one of the fumigation areas, first, the fumigation suitability determination means 1j determines whether or not fumigation suitability information in the fumigation suitability management information 32, which corresponds to the selected exhibit, is set to be "inhibited". Here, if the fumigation suitability information is set to be "inhibited", the fumigation suitability determination means 1j determines that the selected exhibit is not permitted to be fumigated, notifies the determination result output means 1k of the fact, and supplies the same with an instruction advising a countermeasure of moving the exhibit. The determination result output means 1k displays the notification and instruction received from the fumigation suitability determination means 1j.

Figure 8:
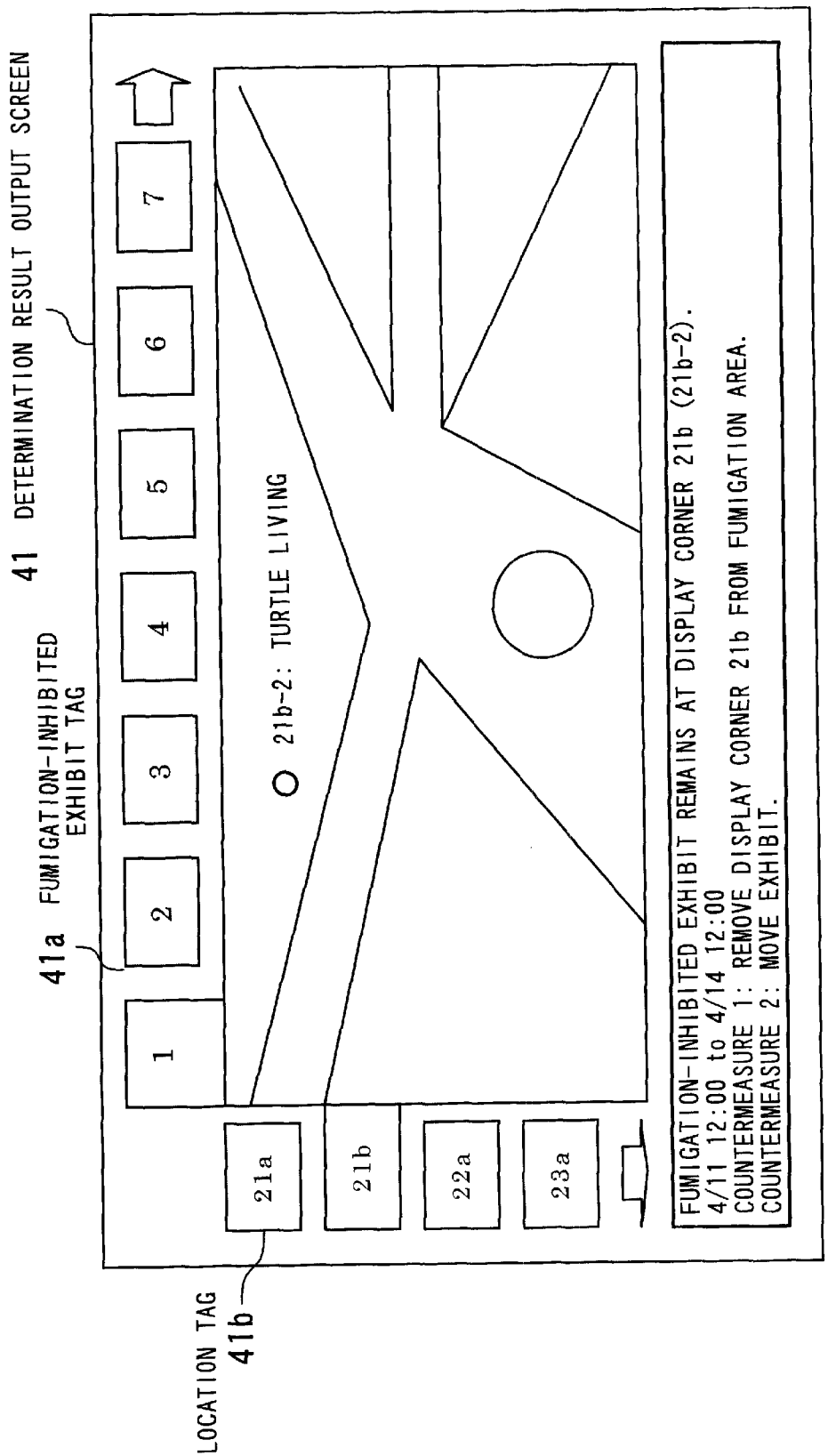
FIG. 8 is a diagram showing a determination result output screen.
Figure 9:
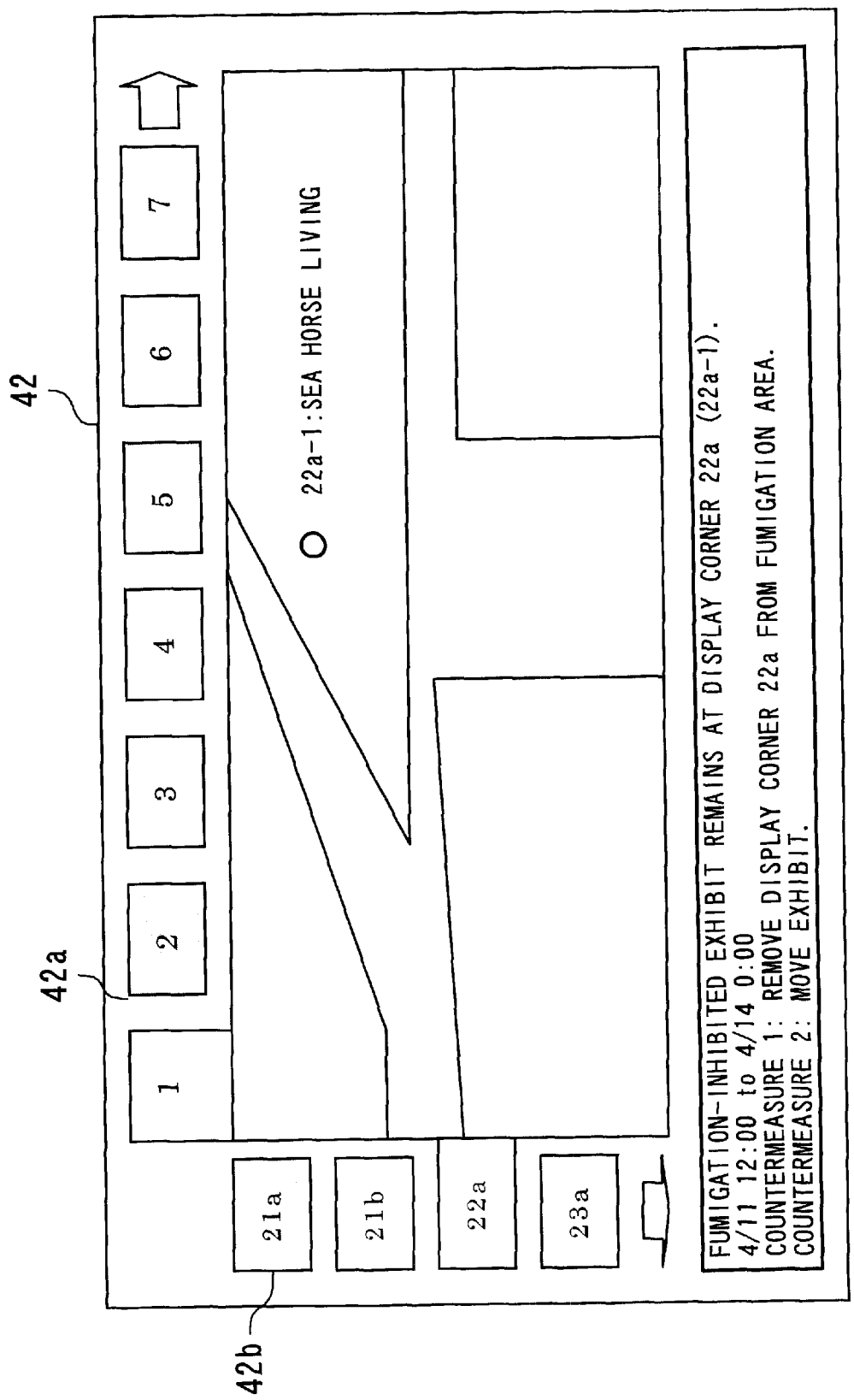
FIG. 9 is a diagram showing another determination result output screen.

FIGS. 8 and 9 show determination result output screens 41, 42 which display notifications of inhibition of fumigation and instructions of moving the exhibit.

In the FIG. 8 determination result output screen 41, there are displayed a message notifying that a fumigation-inhibited exhibit (living turtle) exists at the display corner 21b, and respective messages advising countermeasures, i.e. removal of the display corner 21b from the fumigation area and moving of the exhibit. Further, in the determination result output screen 41 are displayed a fumigation-inhibited exhibit tag 41a which is indicative of a fumigation-inhibited exhibit whose fumigation is inhibited, and an location tag 41b which is indicative of a place where the fumigation-inhibited exhibit is arranged. These tags make it possible to clearly show the user a fumigation-inhibited exhibit and a place where it is arranged. In the FIG. 9 determination result output screen 42, there are displayed a message notifying that a fumigation-inhibited exhibit (living sea horse) exists at the display corner 22a, and respective messages advising countermeasures of removal of the display corner 22a from the fumigation area and moving of the exhibit, to eliminate the inconvenience. Further, in this case as well, similarly to the case of FIG. 8, a fumigation-inhibited exhibit tag 42a and an location tag 42b are displayed.

If the extracted display location at which is displayed the exhibit selected for determination of fumigation suitability thereof is coincident with any one of the fumigation areas, and the fumigation suitability information in the fumigation suitability management information 32, which corresponds to the selected exhibit, is not set to be "inhibited", the fumigation suitability determination means 1j determines whether or not a fumigation type corresponding to a fumigation area coincident with the extracted display section, that is, a fumigation type for fumigating the fumigation area is coincident with the fumigation suitability information in the fumigation suitability management information 32, which corresponds to the selected exhibit. The term "coincident" in this context is used to mean fumigatable or suitable for a fumigation. For instance, when the fumigation type for the fumigation area is "fumigation A", and the fumigation suitability information of an exhibit displayed in the fumigation area shows "fumigation A, fumigation C" which indicates that the exhibit is permitted to be fumigated only by the fumigation A and the fumigation C, it is determined that the fumigation type is coincident with the fumigation suitability information, and hence that it is possible to fumigate the exhibit. Here, if it is determined that the fumigation type is not coincident with the fumigation suitability information, and hence that the fumigation is inhibited, the fumigation suitability determination means 1j notifies the determination result output means 1k of the fact, and supplies the same with an instruction advising a countermeasure of changing the fumigant gas to the same. The determination result output means 1k displays the notification and instruction received from the fumigation suitability determination means 1j.

Figure 10:
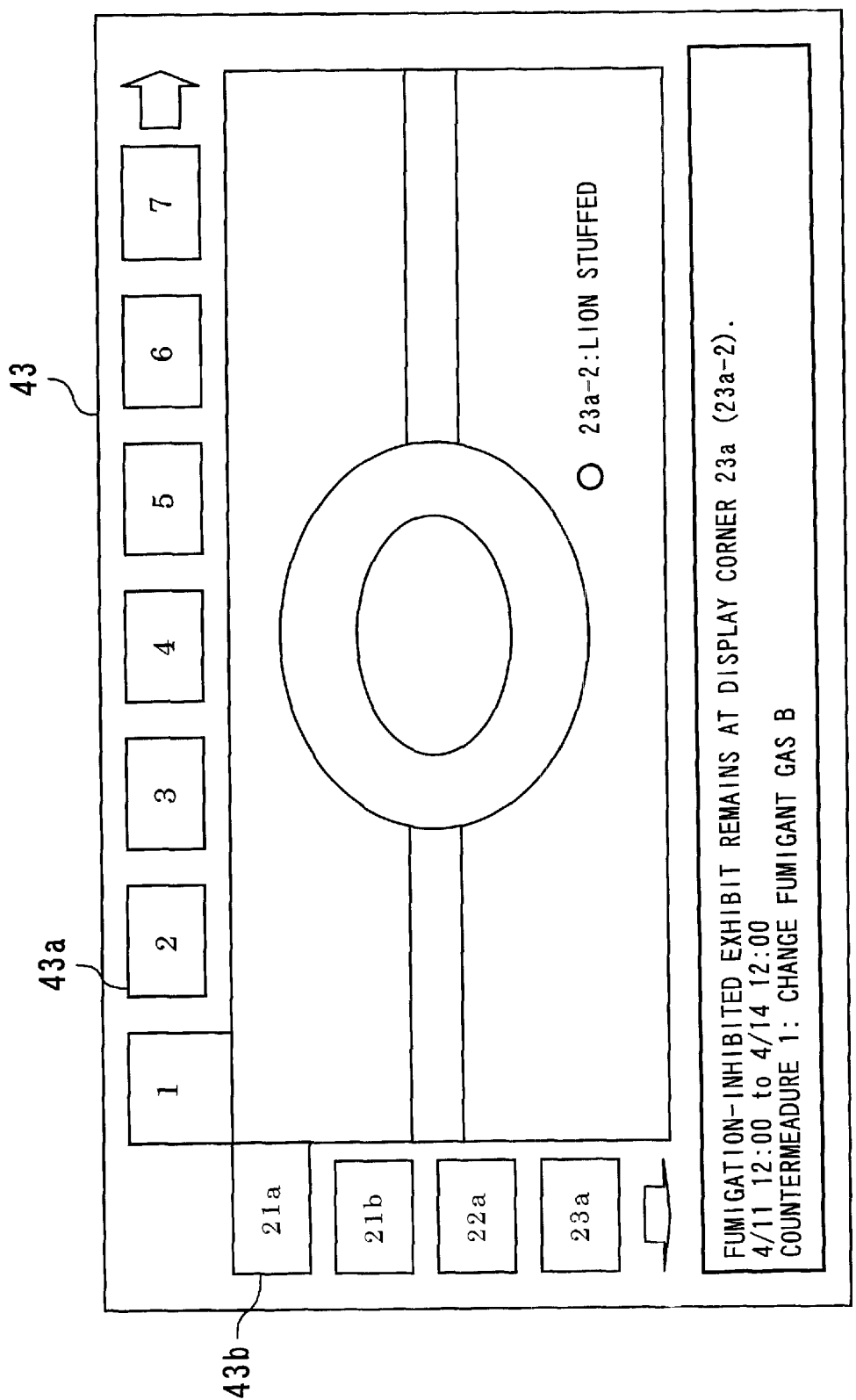
FIG. 10 is a diagram showing another determination result output screen.

FIG. 10 is a diagram showing a determination result output screen 43 which displays a message notifying that the fumigation is inhibited, and a message advising a countermeasure of changing the fumigant gas. In the FIG. 10 determination result output screen 43, there are displayed a message notifying that there exists a fumigation-inhibited exhibit (stuffed lion) at the display corner 23a, and a message advising a countermeasure of changing the fumigant gas B. Further, in this case as well, similarly to the case of FIG. 8, a fumigation-inhibited exhibit tag 43a and an location tag 43b are displayed.

The user views the determination result output screens 41 to 43 output as above, carries out an operation for avoiding the fumigation-inhibited state, in accordance with the instructions. Now, the term "operation for avoiding the fumigation-inhibited state" is used to mean, for instance, a change of a fumigation area, a change of a fumigation type, a shift of the location of an exhibit, or the like. This operation will be described in detail hereinafter.

After the above operation for avoiding the fumigation-inhibited state has been carried out as described above, the fumigation suitability determination means 1j determines again whether or not fumigation is permitted. This sequence of operations is repeatedly carried out until it is determined that every exhibit is permitted to be fumigated, and the fumigation suitability determination operation is terminated when it is determined that every exhibit is permitted to be fumigated.

Next, each of the above-mentioned operations will be described hereinafter with reference to flowcharts.

First of all, operations for producing a fumigation schedule table 31 are described with reference to a flowchart.

Figure 11:
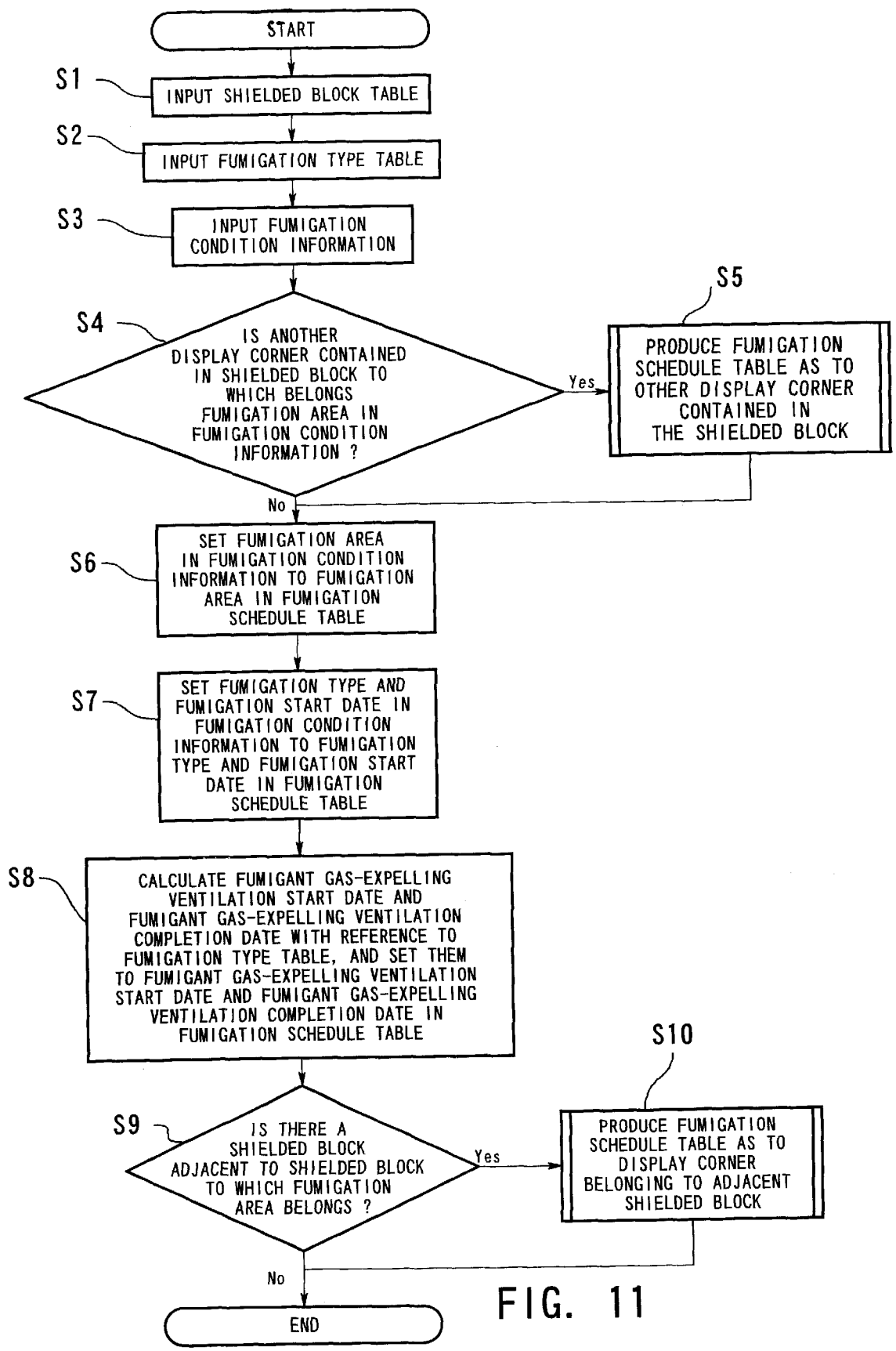
FIG. 11 is a flowchart showing operations for producing a fumigation schedule table.

FIG. 11 is a flowchart showing the operations for producing the fumigation schedule table 31.

[S1] A shielded block table 12 is input.

[S2] A fumigation type table 13 is input.

[S3] Fumigation condition information 11 is input.

[S4] It is determined whether or not there exists another display corner in a shielded block to which belongs a fumigation area in the fumigation condition information 11 entered at the step S3. Here, if it is determined that another display corner exists in the shielded block, the program proceeds to a next step S5, whereas if it not, the program proceeds to a step S6.

[S5] A fumigation schedule table 31 is produced as to the display corner other than the fumigation area, contained in the shielded block to which belongs the fumigation area in the fumigation condition information 11.

[S6] The fumigation area in the fumigation condition information 11 entered at the step S3 is set to a fumigation area in the fumigation schedule table 31.

[S7] A fumigation type and a fumigation start date in the fumigation condition information 11 entered at the step S3 are set to a fumigation type and a fumigation start date in the fumigation schedule table 31.

[S8] A fumigant gas-expelling ventilation start date and a fumigant gas-expelling ventilation completion date are calculated with reference to the fumigation type table 13, and set to a fumigant gas-expelling ventilation start date and a fumigant gas-expelling ventilation completion date in the fumigation schedule table 31.

[S9] It is determined whether or not there exists a shielded block adjacent to the shielded block to which the fumigation area belongs. Here, if it is determined that there exists an adjacent shielded block, the program proceeds to a next step S9, whereas if not, the program is immediately terminated.

[S10] A fumigation schedule table 31 is produced for a display corner belonging to the adjacent shielded block.

Figure 12:
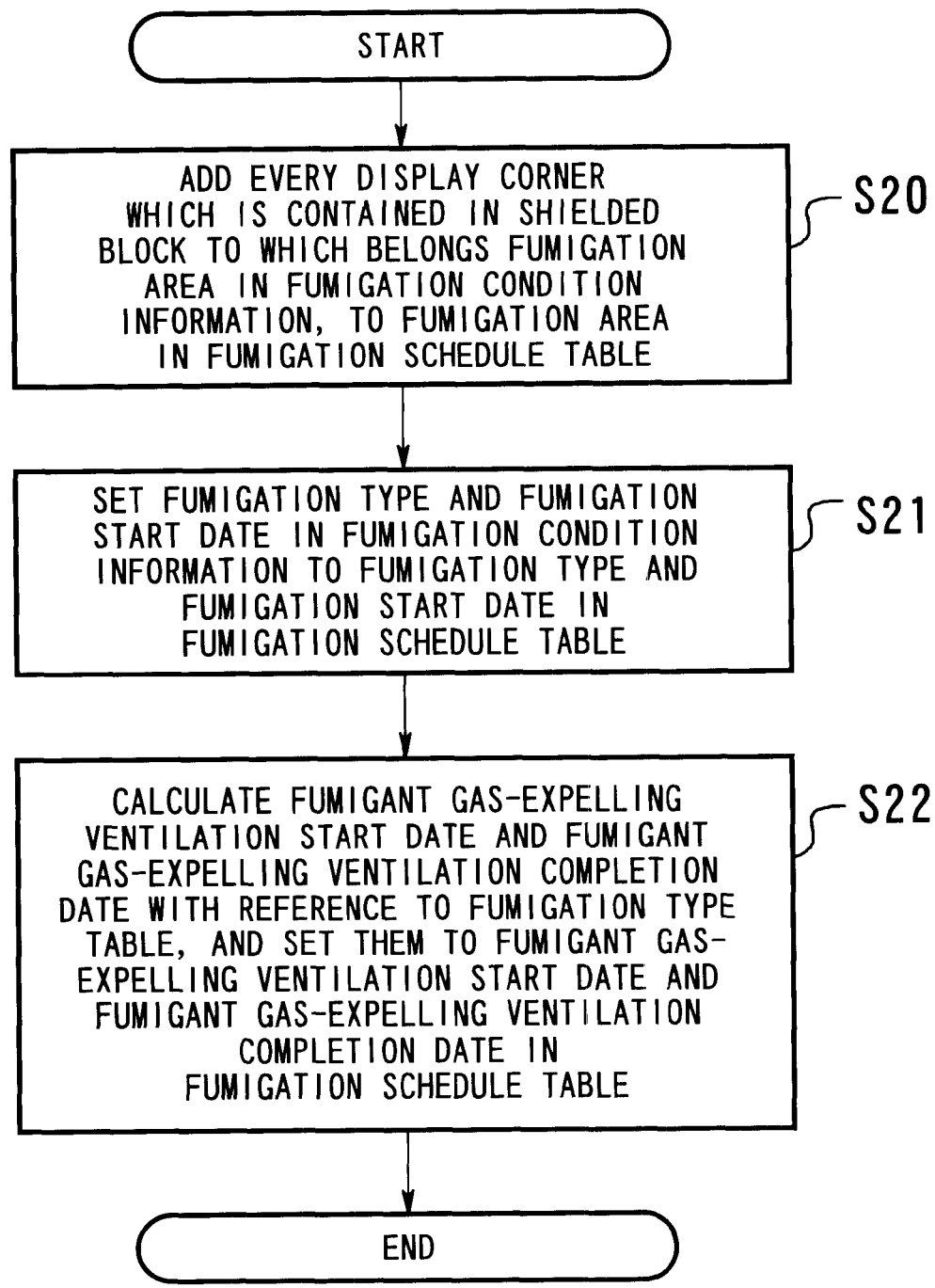
FIG. 12 is a flowchart showing a detailed operation carried out at a step S5 in FIG. 11.

FIG. 12 is a flowchart showing detailed operations carried out at the step S5 in FIG. 11.

[S20] Every display corner which is contained in the shielded block to which belongs the fumigation area in the fumigation condition information 11 is added to the fumigation area in the fumigation schedule table 31.

[S21] A fumigation type and a fumigation start date in the fumigation condition information 11 are set to a fumigation type and a fumigation start date in the fumigation schedule table 31.

[S22] A fumigant gas-expelling ventilation start date and a fumigant gas-expelling ventilation completion date are calculated with reference to the fumigation type table 13, and set to a fumigant gas-expelling ventilation start date and a fumigant gas-expelling ventilation completion date in the fumigation schedule table 31.

Figure 13:
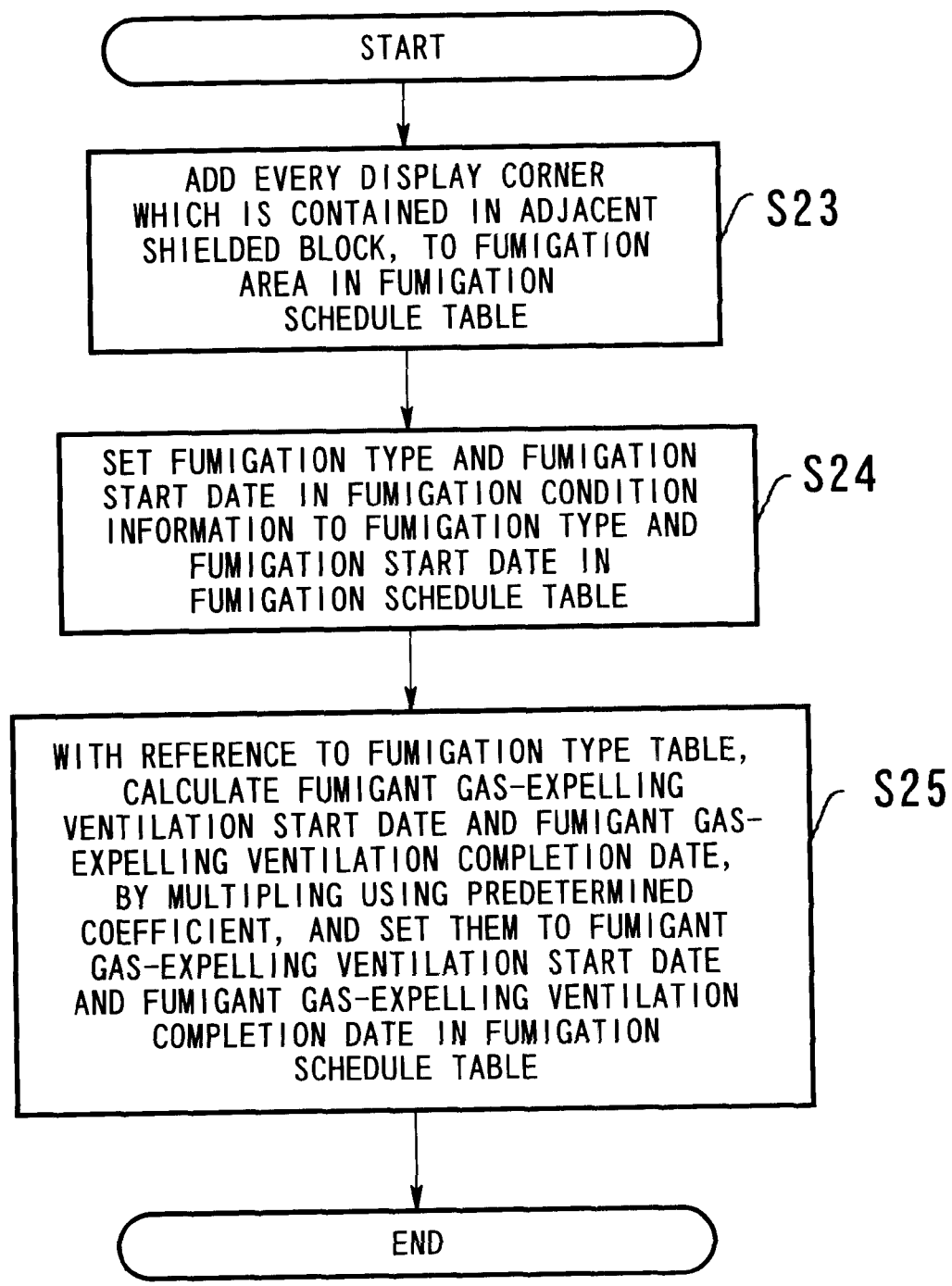
FIG. 13 is a flowchart showing a detailed operation carried out at a step S10 in FIG. 11.

FIG. 13 is a flowchart showing detailed operations carried out at the step S10 in FIG. 11.

[S23] Every display corner which is included in the adjacent shielded block is added to the fumigation area in the fumigation schedule table 31.

[S24] A fumigation type and a fumigation start date in the fumigation condition information 11 are set to a fumigation type and a fumigation start date in the fumigation schedule table 31.

[S25] A fumigant gas-expelling ventilation start date and a fumigant gas-expelling ventilation completion date are calculated with reference to the fumigation type table 13. Here, a predetermined coefficient is used as a multiplier factor when the fumigant gas-expelling ventilation completion date is calculated. The calculated fumigant gas-expelling ventilation start date and fumigant gas-expelling ventilation completion date are set to a fumigant gas-expelling ventilation start date and a fumigant gas-expelling ventilation completion date in the fumigation schedule table 31.

Next, operations for producing a fumigation suitability management information 32 will be described with reference to a flowchart.

Figure 14:
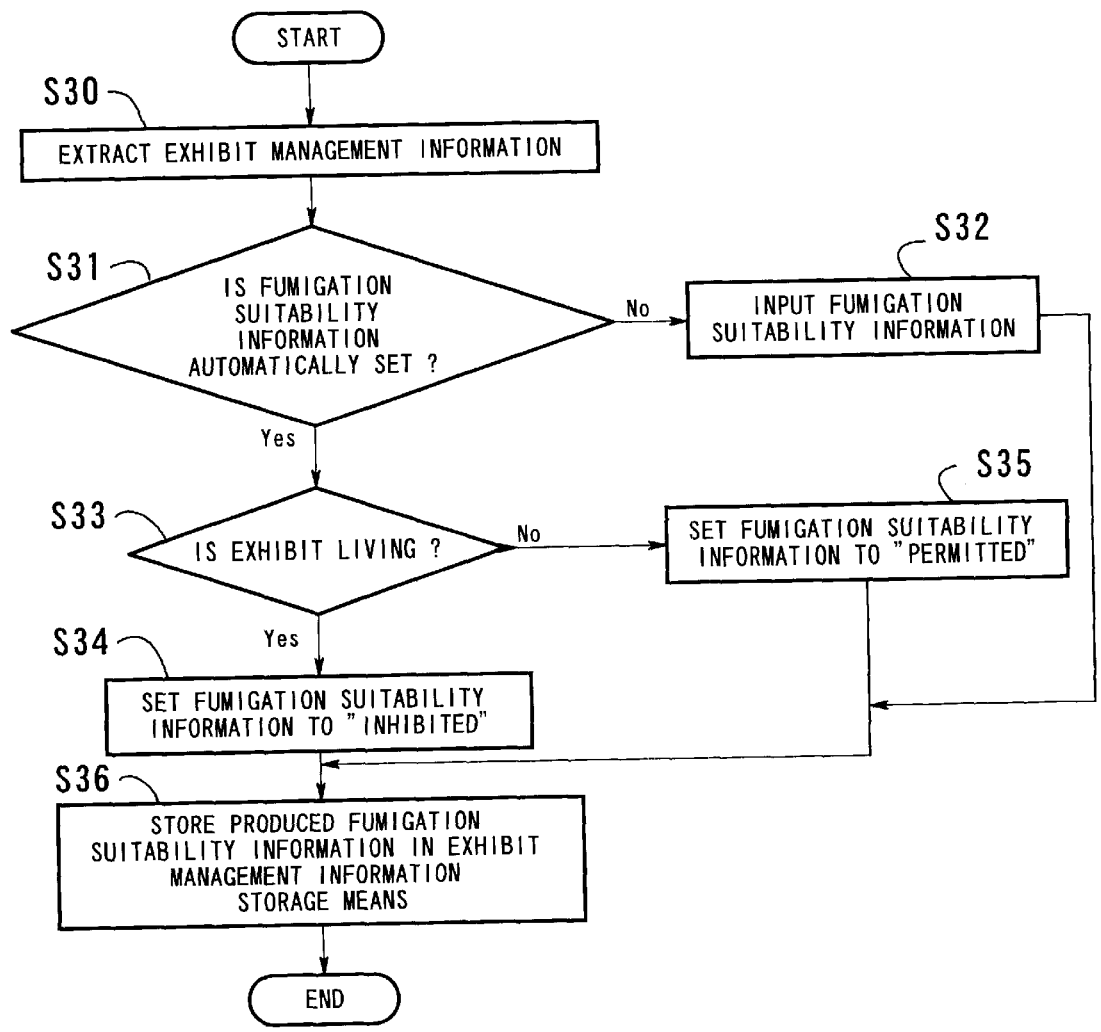
FIG. 14 is a flowchart showing operations for producing fumigation suitability management information.

FIG. 14 is a flowchart showing the operations for producing the fumigation suitability management information 32.

[S30] Exhibit management information 14 stored in the exhibit management information storage means if is extracted.

[S31] It is determined whether or not fumigation suitability information 15 is to be set automatically. Here, if the fumigation suitability information 15 is to be set automatically, the program proceeds to a step S33, whereas if not, the program proceeds to a step S32.

[S32] The fumigation suitability information 15 is input.

[S33] It is determined with reference to the exhibit management information 14 whether or not the exhibit is a living thing. Here, if it is determined that the exhibit is a living thing, the program proceeds to a step S34, whereas if not, the program proceeds to a step S35.

[S34] The fumigation suitability information 15 is set to "inhibited".

[S35] The fumigation suitability information 15 is set to be "permitted".

[S36] The fumigation suitability management information 32 thus produced is stored in the exhibit management information storage means 1f.

Next, the fumigation suitability determination operation is described with reference to a flowchart.

Figure 15:
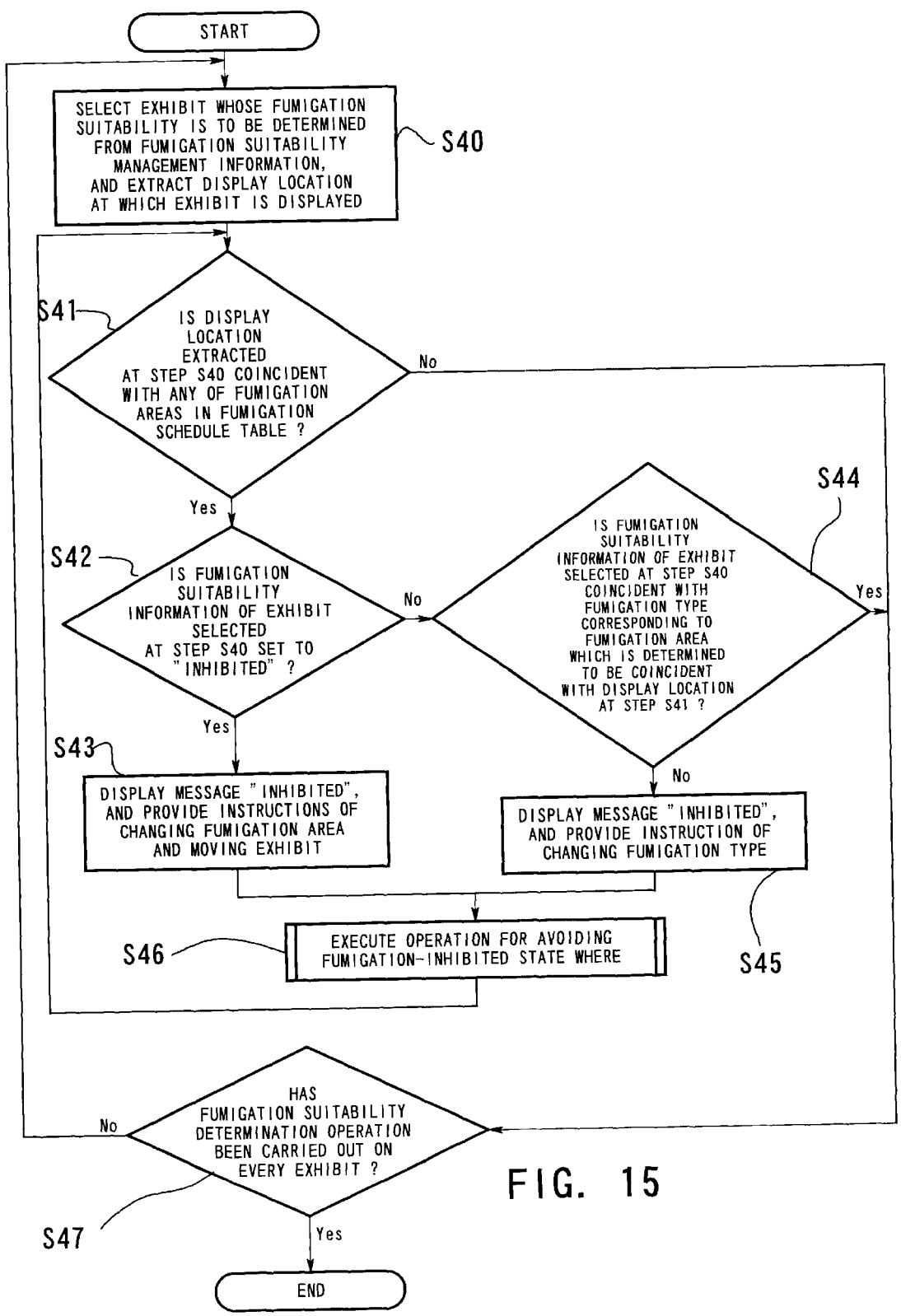
FIG. 15 is a flowchart showing a fumigation suitability determination operation.

FIG. 15 is a flowchart showing the fumigation suitability determination operation.

[S40] An exhibit whose fumigation suitability is to be determined is selected from the fumigation suitability management information 32, and a display location at which the exhibit is displayed is extracted.

[S41] It is determined whether or not the display location extracted at the step S40 is coincident with any one of the fumigation areas in the fumigation schedule table 31. Here, if it is determined that the display location is coincident with any one of the fumigation areas, the program proceeds to a step S42, whereas if not, the program proceeds to a step S47.

[S42] It is determined whether or not fumigation suitability information of the exhibit selected at the step S40 is set to "inhibited". If the fumigation suitability information is set to "inhibited", the program proceeds to a step S43, whereas if not, the program proceeds to a step S44.

[S43] A message notifying "inhibited" is displayed, and messages advising countermeasures of changing the fumigation area and moving the exhibit are also displayed.

[S44] It is determined whether or not the fumigation suitability information of the exhibit selected at the step S40 is coincident with a fumigation type corresponding to the fumigation area which is determined to be coincident with the display location at the step S41. If the fumigation suitability information is coincident with the fumigation type, the program proceeds to a step S47, whereas if not, the program proceeds to a step S45.

[S45] A message notifying "inhibited" is displayed, and a message advising a countermeasure of changing the fumigation type is also displayed.

[S46] An operation for avoiding the fumigation-inhibited state is carried out.

[S47] It is determined whether or not the fumigation suitability determination operation has been carried out on every exhibit. Here, if it is determined that the fumigation suitability determination operation has been carried out on every exhibit, the program is immediately terminated, whereas if not, the program proceeds to the step S40.

Figure 16:
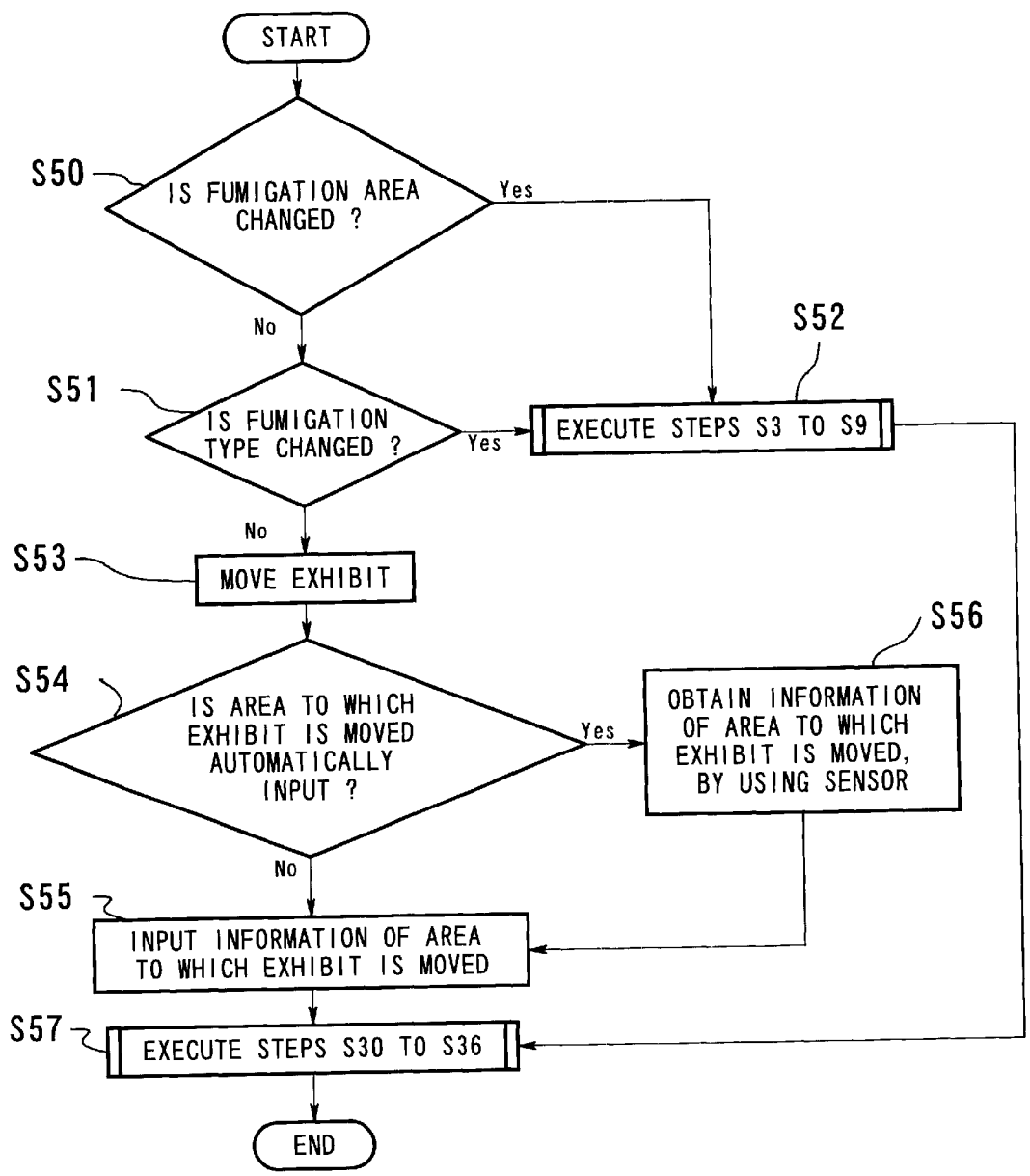
FIG. 16 is a flowchart showing a detailed operation carried out at a step S46 in FIG. 15.

FIG. 16 is a flowchart showing detailed operations carried out at the step S46 in FIG. 15.

[S50] It is selected whether or not the fumigation area is to be changed. Here, if the fumigation area is to be changed, the program proceeds to a step S52, whereas if not, the program proceeds to a step S51.

[S51] It is selected whether or not the fumigation type is to be changed. Here, if the fumigation type is to be changed, the program proceeds to the step S52, whereas if not, the program proceeds to a step S53.

[S52] The steps S3 to S9 are carried out to set the fumigation schedule table 31 again.

[S53] The exhibit is moved.

[S54] It is selected whether or not an area to which the exhibit is moved is to be automatically input. Here, if it is selected that the area is to be automatically input, the program proceeds to a step S56, whereas if not, the program proceeds to a step S55.

[S55] Information of the area to which the exhibit is moved is input from the exhibit management information input means 1e to change contents of the exhibit management information 14 stored in the exhibit management information storage means 1f.

[S56] The information of the area to which the exhibit is moved is obtained by using a sensor to change the contents of the exhibit management information 14 stored in the exhibit management information storage means 1f.

[S57] The steps S30 to S36 are carried out to set the fumigation suitability management information 32 again.

As described above, in the present embodiment, fumigation suitability management information 32 is produced by adding the fumigation suitability information 15 indicative of whether a fumigation is permitted or inhibited to the exhibit management information 14 for use in managing exhibits, and a fumigation schedule table 31 showing a schedule for execution of fumigation is created. Then, by using the fumigation suitability management information 32 and the fumigation schedule table 31, it is determined whether or not fumigation can be carried out. This makes it possible to easily determine whether or not fumigation can be carried out on exhibits.

Further, the above processing functions can be implemented by a computer. In such a case, the details of processing functions that the fumigation determination apparatus 1 should have are described in a program stored in a computer-readable storage medium. By executing the program by a computer, it is possible to perform the above-described processes. The computer-readable recording media includes a magnetic recording device, semiconductor memory and the like. To distribute the program to the market, the program may be stored in portable storage medium such as CD-ROMs (Compact Disk Read Only Memories) or floppy disks. Alternatively, the program may be stored in the storage device of a computer connected to a network and may be transferred to other computers through the network. To execute the program by a computer, the program stored in a hard disk unit or the like of the computer is loaded into the main memory and executed.

As described hereinbefore, according to the present invention, fumigation suitability management information is produced by adding fumigation suitability information indicative of whether fumigation is permitted or inhibited to exhibit management information for use in managing exhibits, and a fumigation schedule table showing a schedule for execution of fumigation is created. Then, by using the fumigation suitability management information and the fumigation schedule table, it is determined whether or not fumigation can be carried out. This makes it possible to easily determine whether or not fumigation can be carried out on exhibits.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A fumigation determination apparatus for determining whether or not fumigation is permitted, comprising:

shielded block table input means for inputting a shielded block table defining shielded blocks which are shielded spaces;

fumigation type table input means for inputting a fumigation type table defining fumigation types indicative of types of fumigant gases;

fumigation condition information input means for inputting fumigation condition information indicative of conditions for said fumigation;

fumigation schedule table-producing means for producing a fumigation schedule table showing a fumigation schedule, by using said shielded block table input by said shielded block table input means, said fumigation type table input by said fumigation type table input means, and said fumigation condition information input by said fumigation condition information input means;

fumigation suitability management information-producing means for producing fumigation suitability management information by adding fumigation suitability information indicative of whether or not said fumigation is permitted to exhibit management information for managing exhibits;

fumigation suitability determination means for determining whether or not said fumigation is permitted by using said fumigation schedule table and said fumigation suitability management information; and determination result output means for outputting results of said determination made by said fumigation suitability determination means.

2. A fumigation determination apparatus according to claim 1, wherein said fumigation condition information contains fumigation area information indicative of areas to be fumigated, fumigation type information indicative of types of fumigant gases for fumigating said areas, and fumigation start date information indicative of dates at which respective fumigating operations are to be started.

3. A fumigation determination apparatus according to claim 1, wherein said fumigation type table contains fumigation types indicative of types of fumigant gases, fumigation time periods, and standard fumigant gas-expelling ventilation time periods.

4. A fumigation determination apparatus according to claim 1, wherein said shielded block table contains display corners for displaying said exhibits, shielded blocks to which said display corners belong, and adjacent shielded blocks which are adjacent to said shielded blocks to which said display corners belong.

5. A fumigation determination apparatus according to claim 1, wherein said fumigation schedule table-producing means calculates a fumigant gas-expelling ventilation start date at which ventilation for expelling each of said fumigant gases is to be started, and a fumigant gas-expelling ventilation completion date at which said ventilation for expelling said each of said fumigant gases is to be completed, based on said fumigation type table, said shielded block table, and said fumigation condition information, and produces said fumigation schedule table which includes areas to be fumigated, said fumigation types indicative of types of said fumigant gases, fumigation start dates at which respective fumigating operations are to be started, said fumigant gas-expelling ventilation completion dates, and said fumigant gas-expelling ventilation completion dates.

6. A fumigation determination apparatus according to claim 1, wherein said fumigation schedule table-producing means produces said fumigation schedule table in which every display corner which is included in one of said shielded blocks to which belongs a display corner indicated by said fumigation area information included in said fumigation condition information is entered as an area to be fumigated.

7. A fumigation determination apparatus according to claim 6, wherein said fumigation schedule table-producing means produces said fumigation schedule table in which every display corner which is included in an adjacent shielded block adjacent to said shielded block to which belongs said display corner indicated by said fumigation area information included in said fumigation condition information is further entered as an area to be fumigated.

8. A fumigation determination apparatus according to claim 7, wherein said fumigation schedule table-producing means produces said fumigation schedule table such that said display corner included in said shielded block to which belongs said display corner indicated by said fumigation area information is differentiated in a schedule table production condition from said display corner included in said adjacent shielded block.

9. A fumigation determination apparatus according to claim 1, further including exhibit management information storage means for storing said exhibit management information, and exhibit management information extraction means for extracting said exhibit management information, and wherein said fumigation suitability management information-producing means produces said fumigation suitability management information by adding said fumigation suitability information to said exhibit management information extracted by said exhibit management information extraction means.

10. A fumigation determination apparatus according to claim 9, wherein said fumigation suitability management information-producing means produces said fumigation suitability management information by adding said fumigation suitability information set automatically, to said exhibit management information.

11. A fumigation determination apparatus according to claim 9, further including fumigation suitability information input means for inputting said fumigation suitability information, and wherein said fumigation suitability management information-producing means produces said fumigation suitability management information by adding said fumigation suitability information input by said fumigation suitability information input means, to said exhibit management information.

12. A fumigation determination apparatus according to claim 1, wherein said fumigation suitability determination means determines whether or not any of areas to be fumigated, said areas being indicated in said fumigation schedule table, and any of display locations at which said exhibits are displayed, said sections being indicated by said fumigation suitability management information, are coincident with each other, wherein no coincidence occurs, it is determined that fumigation is permitted, and wherein any coincidence occurs, it is determined whether or not fumigation is permitted, by comparing fumigation types indicated in said fumigation schedule table with fumigation suitability information indicated by said fumigation suitability management information.

13. A fumigation determination apparatus according to claim 1, wherein said determination result output means displays information as to whether or not fumigation is permitted, and if fumigation is inhibited, said determination result output means further displays a countermeasure thereof.

14. A method of determining whether or not fumigation is permitted, comprising the steps of:

inputting a shielded block table defining shielded blocks which are shielded spaces;

inputting a fumigation type table defining fumigation types indicative of types of fumigant gases;

inputting fumigation condition information indicative of conditions for said fumigation;

producing a fumigation schedule table showing a fumigation schedule, by using said shielded block table, said fumigation type table, and said fumigation condition information;

producing fumigation suitability management information by adding fumigation suitability information indicative of whether or not said fumigation is permitted to exhibit management information for managing exhibits;

determining whether not said fumigation is permitted, by using said fumigation schedule table and said fumigation suitability management information; and outputting results of said determination as to whether or not said fumigation is permitted.

15. A computer-readable storage medium which stores a program causing a computer to function as:

shielded block table input means for inputting a shielded block table defining shielded blocks which are shielded spaces;

fumigation type table input means for inputting a fumigation type table defining fumigation types indicative of types of fumigant gases;

fumigation condition information input means for inputting fumigation condition information indicative of conditions for said fumigation;

fumigation schedule table-producing means for producing a fumigation schedule table showing a fumigation schedule, by using said shielded block table, said fumigation type table, and said fumigation condition information;

fumigation suitability management information-producing means for producing fumigation suitability management information by adding fumigation suitability information indicative of whether or not said fumigation is permitted to exhibit management information for managing exhibits;

fumigation suitability determination means for determining whether said fumigation is permitted, by using said fumigation schedule table and said fumigation suitability management information; and determination result output means for outputting results of determination made by said fumigation suitability determination means.

* * * * *